United States Patent [19]
Rotunno

[11] Patent Number: 5,784,447
[45] Date of Patent: Jul. 21, 1998

[54] METHOD AND CIRCUIT ARRANGEMENT FOR ALLOWING TELEPHONE CONVERSATIONS AMONG SEVERAL USERS

[75] Inventor: Antonio Rotunno, Salerno, Italy

[73] Assignee: Alcatel N.V., Rijswijk, Netherlands

[21] Appl. No.: 574,376

[22] Filed: Dec. 18, 1995

[30] Foreign Application Priority Data

Dec. 20, 1994 [IT] Italy .................. MI94A 2564

[51] Int. Cl.[6] .................. H04M 3/56; H04Q 11/04
[52] U.S. Cl. .................. 379/202; 370/267
[58] Field of Search .................. 370/62, 260, 261, 370/262, 263, 264, 265, 266, 267, 268, 269; 379/202, 203, 204, 205, 206, 215

[56] References Cited

U.S. PATENT DOCUMENTS

| | | | |
|---|---|---|---|
| 4,558,180 | 12/1985 | Scordo | 370/62 X |
| 4,754,258 | 6/1988 | Nakamura et al. | 370/62 X |
| 5,054,021 | 10/1991 | Epps | 379/202 X |
| 5,457,685 | 10/1995 | Champion | 379/202 X |

*Primary Examiner*—Harry S. Hong
*Attorney, Agent, or Firm*—Ware, Fressola, Van Der Sluys & Adolphson LLP

[57] ABSTRACT

A method and circuit arrangement for allowing and improving the telephone conversation among several users in digital switched telephone PCM systems, using a multiplication coefficient inversely proportional to the level of each line.

5 Claims, 1 Drawing Sheet

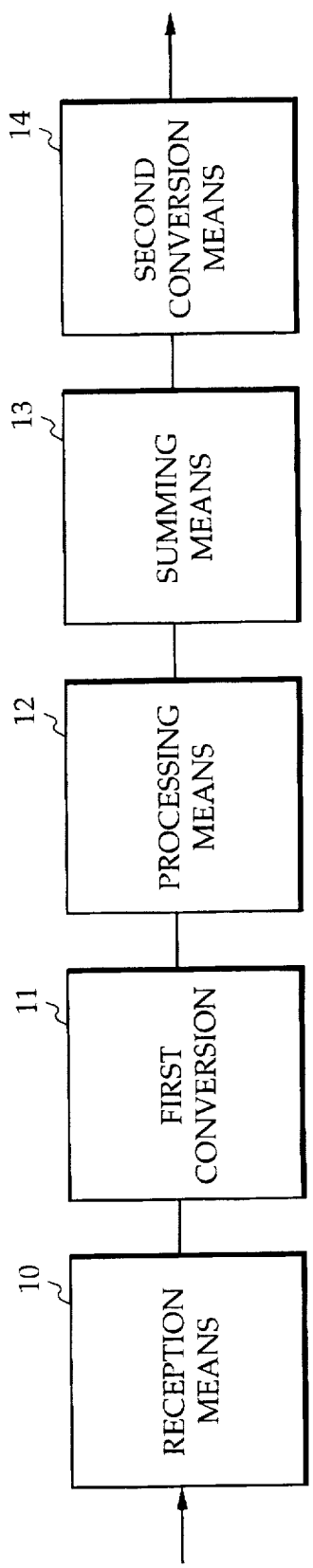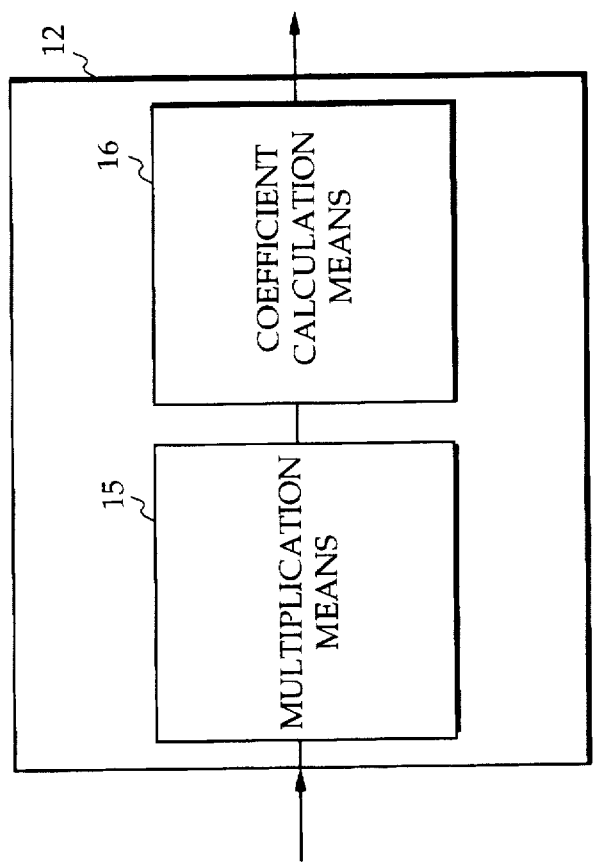

METHOD AND CIRCUIT ARRANGEMENT FOR ALLOWING TELEPHONE CONVERSATIONS AMONG SEVERAL USERS

TECHNICAL FIELD

The invention relates to a method and to a circuit arrangement for allowing telephone conversations among several users in a digital switched telephone system, in particular in Pulse Code Modulation (PCM) Systems.

BACKGROUND OF THE INVENTION

When more than two users have to talk to each other it is necessary to apply special techniques to the telecommunication equipment so that each receives the audio signals from all others.

The simplest technique applicable in this circumstance is to sum all received signals and send this sum-signal to the conferees. However, this technique provides a signal with too high a background noise and does not allow clear listening, in particular when several users speak simultaneously and therefore their voices overlap.

Another technique for improving the preceding one is known which determines, at first, through suitable rules, who is the user having the highest signal level; then the signals from the conferees are summed leaving the highest-level signal unaltered and the signals from the other users are attenuated by a prefixed value.

This technique, even if it partially solves the above-mentioned problems, does not eliminate those problems due to high differences in the signal level between the parties, such as those due to differences in the state of the individual lines that could alter the choice of the user with the highest signal. The resulting bad working becomes more apparent as the number of the users, and therefore of the lines, increases. For this reason, the maximum number of users allowed by this technique is restricted to only a few units.

In the case where PCM digital networks are considered, signals are coded in digital values according to a non-linear, approximately logarithmic, characteristic. In this circumstance it is possible to carry out the operations described above only when the samples are coded in a linear manner. Therefore it is necessary to carry out the appropriate conversions.

SUMMARY OF THE INVENTION

It is an object of the present invention to provide a technique capable of overcoming the drawbacks of the known art.

This object is achieved, in accordance with the present invention, through a method for allowing telephone conversations among several users in a digital switched telephone system, said method comprising the steps of receiving samples of a speech signal of each one of said users, said samples being non-linearly encoded, converting said non-linearly encoded samples into linearly encoded samples, processing said linearly encoded samples to thereby generate processed linearly encoded samples, summing said processed linearly encoded samples over said several users to obtain a sum of processed linearly encoded samples, and converting said sum of processed linearly encoded samples into a non-linearly encoded sum of processed samples, characterized in that, to perform said processing, said linearly encoded samples are varied in level through multiplication thereof with a coefficient which is calculated for each user and which is inversely proportional to the level of said speech signal received from said user.

It is also achieved by a circuit arrangement for allowing telephone conversations among several users in a digital switched telephone system, said circuit arrangement including reception means adapted to receive samples of a speech signal of each one of said users, said samples being non-linearly encoded, first conversion means adapted to convert said non-linearly encoded samples into linearly encoded samples, processing means for processing said linearly encoded samples and to thereby generate processed linearly encoded samples, summing means for summing said processed linearly encoded samples over said several users to obtain a sum of processed linearly encoded samples, and second conversion means for converting said sum of processed linearly encoded samples into a non-linearly encoded sum of processed samples, characterized in that said processing means comprises multiplication means for varying the level of said linearly encoded samples by multiplication thereof with a coefficient which is calculated for each one of said users, and coefficient calculating means for calculating for each one of said users said coefficient so that said coefficient is inversely proportional to the level of said speech signal received from said user.

By varying the level of each signal in a different manner for each user, the abovementioned drawbacks are eliminated. Through this technique it is possible to allow the conversation of more than thirty users. All the lines of the users are set to the same condition, whatever the original signal and the state of the individual lines may be.

All interferences and noise of the various lines are thus eliminated. Hence a better understanding of the speech of the various users is obtained. Moreover, the structure of the system implementing such technique is modular and therefore insertable in any telecommunication equipment and can further be used in combination with the known techniques described above.

BRIEF DESCRIPTION OF THE DRAWINGS

The present invention is described from the following description of a not limiting embodiment thereof taken in conjunction with the attached drawing in which the FIG. 1 shows the general block diagram of a conference system and FIG. 2 shows a block diagram of a processing means shown in FIG. 1.

BEST MODE FOR CARRYING OUT THE INVENTION

In the following reference will be made to a not limiting example of a PCM network and therefore operations on samples of signals of each user will be carried out.

With reference to the FIG., the signal samples are converted into linear samples through converter 11 (A- or µ-law to linear-law conversion), samples are then processed in block 12 in accordance with the invention, then they are summed and optionally further processed in a known manner in block 13, and converted again into non-linear samples in block 14 (linear to A- or µ-law conversion). Obviously the conversion law may change according to the reference standard.

All these blocks are connected to each other as indicated. The conversion from A- or µ-law to linear law and vice versa is well known to those skilled in the art and is not described in detail here.

In accordance with the invention, associated with each user is a coefficient to obtain the level variation through multiplication by the speech samples of the various users.

At the beginning, all coefficients are set to 1, i.e. no gain and no attenuation. Associated with each user (channel) is a score, computed as a sum of the absolute values of N speech samples. The score is then suitably compared with a predetermined threshold to determine if there is speech activity by the user. For the circumstance when the sum value is lower than such a threshold, the coefficient for the level control is left unchanged, otherwise it is updated according to the following formula:

$$C_i = K_1 C_{(i-1)} - K_2 S + K_3$$

where Ci is the coefficient at the i.th instant,

C(i-1) is the coefficient computed at the preceding instant,

S is the sum of the absolute value of N samples of said signals, and

K1, K2, K3 are suitable constants to be suitably optimized.

The new coefficient is updated each time a new score is obtained, i.e. every N frames; it depends on the computed preceding value multiplied by a suitable oblivion factor ($K_1$), on a constant ($K_3$) and on the score multiplied in turn by a suitable coefficient ($K_2$). The higher the score (the higher the level) the lower the level coefficient and vice versa.

It is to be pointed out that it is not necessary to carry out frequent updatings of the level coefficient since, once the quality (level) of the signal is determined, it will remain approximately the same during the whole conversation. Moreover, the use of the activity threshold avoids the amplification of the background noise when no speech signal is present. The improvements obtained during the use of the level control allow the application of this conference system to the entire bundle of PCM channels. In particular, FIG. 1 shows a circuit arrangement for allowing telephone conversations among several users in a digital switched telephone system. The circuit arrangement includes a reception means 10, a first conversion means 11, a processing means 12, a summing means 13, and a second conversion means 14. The reception means 10 receives samples of a speech signal of each one of the users, said samples being non-linearly encoded. The first conversion means 11 converts the non-linearly encoded samples into linearly encoded samples. The processing means 12 processes the linearly encoded samples and thereby generates processed linearly encoded samples. The summing means 13 sums the processed linearly encoded samples over said several users to obtain a sum of processed linearly encoded samples. The second conversion means 14 converts the sum of processed linearly encoded samples into a non-linearly encoded sum of processed samples.

As shown in FIG. 2, the processing means 12 includes a multiplication means 15 and a coefficient calculating means 16. The multiplication means 15 varies the level of the linearly encoded samples by multiplication thereof with a coefficient which is calculated for each one of the users. The coefficient calculating means calculates for each one of the users the coefficient so that the coefficient is inversely proportional to the level of the speech signal received from the user.

What is claimed is:

1. A method for allowing telephone conversations among several users in a digital switched telephone system, said method comprising the steps of:

a) receiving samples of a speech signal of each one of said users, said samples being non-linearly encoded;

b) converting said non-linearly encoded samples into linearly encoded samples;

c) processing said linearly encoded samples to thereby generate processed linearly encoded samples;

d) summing said processed linearly encoded samples over said several users to obtain a sum of processed linearly encoded samples; and e) converting said sum of processed linearly encoded samples into a non-linearly encoded sum of processed samples, characterized in that, to perform said processing, said linearly encoded samples are varied in level through multiplication thereof with a coefficient which is calculated for each user and which is inversely proportional to the level of said speech signal received from said user.

2. A method according to claim 1, characterized in that for each said user, said coefficient is updated periodically.

3. A method according to claim 1, characterized in that for each said user, said coefficient is computed according to the formula $C_i = K_1 C_{(i-1)} - K_2 S + K_3$, wherein $C_i$ represents the value of said coefficient at the ith instant, $C_{i-1}$ represents the value of said coefficient at the preceding instant, S represents the sum of absolute values of N said samples, N being an integer value, and wherein $K_1$, $K_2$ and $K_3$ are suitable constants.

4. A method according to claim 1, characterized in that said multiplication of each of said samples with said coefficient associated with said user and different for each user, is performed only if the sum of absolute values of N said samples exceeds a predefined threshold value.

5. A circuit arrangement for allowing telephone conversations among several users in a digital switched telephone system, said circuit arrangement including:

a) reception means (10) adapted to receive samples of a speech signal of each one of said several users, said samples being non-linearly encoded;

b) first conversion means (11) adapted to convert said non-linearly encoded samples into linearly encoded samples;

c) processing means (12) for processing said linearly encoded samples and to thereby generate processed linearly encoded samples;

d) summing means (13) for summing said processed linearly encoded samples over said several users to obtain a sum of processed linearly encoded samples; and e) second conversion means (14) for converting said sum of processed linearly encoded samples into a non-linearly encoded sum of processed samples;

characterized in that said processing means (12) comprises:

f) multiplication means (15) for varying the level of said linearly encoded samples by multiplication thereof with a coefficient which is calculated for each one of said several users; and g) coefficient calculating means (16) for calculating for each one of said several users said coefficient so that said coefficient is inversely proportional to the level of said speech signal received from said user.

* * * * *